United States Patent
Suh (10) Patent No.: US 8,331,287 B2
(45) Date of Patent: Dec. 11, 2012

(54) METHOD AND SYSTEM FOR MANAGING MOBILITY IN A MOBILE COMMUNICATION SYSTEM USING MOBILE INTERNET PROTOCOL

(75) Inventor: Kyung-Joo Suh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 721 days.

(21) Appl. No.: 12/197,364

(22) Filed: Aug. 25, 2008

(65) Prior Publication Data

US 2009/0052379 A1 Feb. 26, 2009

(30) Foreign Application Priority Data

Aug. 24, 2007 (KR) .................... 10-2007-0085779

(51) Int. Cl.
*H04W 4/00* (2009.01)
(52) U.S. Cl. ...................................... 370/328; 370/401
(58) Field of Classification Search .................. 370/254, 370/310, 328, 331, 338, 352, 401; 726/4–6; 713/155

See application file for complete search history.

(56) References Cited

U.S. PATENT DOCUMENTS

| | | | |
|---|---|---|---|
| 2002/0049059 A1* | 4/2002 | Soininen et al. | 455/439 |
| 2004/0019539 A1* | 1/2004 | Raman et al. | 705/29 |
| 2004/0029584 A1* | 2/2004 | Le et al. | 455/432.1 |
| 2004/0078600 A1 | 4/2004 | Nilsen et al. | |
| 2004/0148428 A1 | 7/2004 | Tsirtsis | |
| 2005/0025091 A1* | 2/2005 | Patel et al. | 370/328 |
| 2005/0191992 A1* | 9/2005 | Inoue et al. | 455/411 |
| 2006/0123079 A1 | 6/2006 | Sturniolo et al. | |
| 2006/0187896 A1* | 8/2006 | Jung | 370/349 |
| 2006/0203791 A1* | 9/2006 | Carrion-Rodrigo et al. | 370/338 |
| 2006/0217147 A1* | 9/2006 | Olvera-Hernandez et al. | 455/552.1 |
| 2007/0189255 A1 | 8/2007 | Navali et al. | |

* cited by examiner

*Primary Examiner* — Jung Park
(74) *Attorney, Agent, or Firm* — Jefferson IP Law, LLP (57) ABSTRACT

A method is provided for managing mobility of an Access Terminal (AT) in a mobile communication system using a Mobile Internet Protocol (MIP). The method includes generating, by an AT that has entered a new network, a Security Parameter Index (SPI) and a security key for mutual authentication with a Home Agent (HA) of the new network, sending, by the AT, a registration request message including authentication information including the SPI, the authentication information being generated using the security key, upon receipt of the registration request message, searching, by the HA, a database for the SPI included in the authentication information, verifying the authentication information according to the search result, upon successful verification of the authentication information, generating, by the HA, mobility binding information of the AT, and sending, by the HA, a registration response message including the HA's IP address.

30 Claims, 7 Drawing Sheets

METHOD AND SYSTEM FOR MANAGING MOBILITY IN A MOBILE COMMUNICATION SYSTEM USING MOBILE INTERNET PROTOCOL

PRIORITY

This application claims the benefit under 35 U.S.C. §119 (a) of a Korean patent application filed in the Korean Intellectual Property Office on Aug. 24, 2007 and assigned Serial No. 2007-85779, the entire disclosure of which is hereby incorporated by reference.

BACKGROUND OF THE INVENTION

1. Field of the Invention The present invention relates to a mobile communication system. More particularly, the present invention relates to a method and system for managing mobility and security of an Access Terminal (AT) in a mobile communication system supporting Mobile Internet Protocol version 4 (MIPv4).

2. Description of the Related Art

In conventional mobile communication systems such as a Code Division Multiple Access (CDMA) 1× system and an Evolution Data Only (EV-DO) system, which were developed by the 3rd Generation Partnership Project 2 (3GPP2) standard group, an Access Network (AN) manages wireless resources, and a Packet Data Serving Node (PDSN), which is a separate entity of a Core Network (CN), performs a procedure associated with packet data communication.

In the conventional mobile communication system supporting Mobile Internet Protocol (MIP), research has been conducted on a scheme for offering mobility to ATs using Mobile IPv4 or Mobile IPv6. However, conventional Mobile IPv4 is unsuitable for use in the improved 3GPP2 Ultra Mobile Broadband (UMB) that is designed to transmit a large volume of data at high speed. Therefore, a plan to improve Mobile IPv4 is being investigated as one of the schemes capable of efficiently supporting UMB. When an AT moves between heterogeneous networks supporting not only UMB but also another network access technology, i.e., even when an AT moves through, for example, a UMB network and a World Interoperability for Microwave Access (WiMAX) network, there is a need for a scheme capable of efficiently supporting mobility of the AT.

Mobile IPv4, which was used in the conventional CDMA 1× system or EV-DO system, requires a long time to carry out the access and call processing process. That is, although Mobile IP, as compared with Simple IP, can provide mobility to ATs, there may be a time delay caused by one or more of a security process for mobility support, a call processing process, and database management in its access, call processing, and security processes. Therefore, there is a demand for an efficient mobility management scheme for addressing the time delay problem in the mobile communication system supporting MIP.

SUMMARY OF THE INVENTION

An aspect of the present invention is to address at least the above-mentioned problems and/or disadvantages and to provide at least the advantages described below. Accordingly, an aspect of the present invention is to provide a method and system for supporting high mobility of an AT and for performing secure and efficient communication in a mobile communication system using Mobile IP.

Another aspect of the present invention is to provide a method and system for supporting high mobility for an AT and performing secure and efficient communication due to the use of improved MIPv4 in a mobile communication system.

A further aspect of the present invention is to provide a method and system for supporting high mobility and security for an AT through improved Mobile IPv4 when the AT moves to another AN supporting another wireless access technology.

Yet another aspect of the present invention is to provide a method and system for efficiently performing address allocation, authentication and call setup for an AT by using improved MIPv4 in an initial call setup process of a mobile communication system.

According to one aspect of the present invention, a method for managing mobility of an Access Terminal (AT) in a mobile communication system using a Mobile Internet Protocol (MIP) is provided. The method includes generating, by an AT that has entered a new network, a Security Parameter Index (SPI) and a security key for mutual authentication with a Home Agent (HA) of the new network, sending, by the AT, a registration request message including authentication information including the SPI, the authentication information being generated using the security key, upon receipt of the registration request message, searching, by the HA, a database for the SPI included in the authentication information, verifying the authentication information according to the search result, upon successful verification of the authentication information, generating, by the HA, mobility binding information of the AT, and sending, by the HA, a registration response message including the HA's IP address.

According to another aspect of the present invention, a mobile communication system for managing mobility of an Access Terminal (AT) using a Mobile Internet Protocol (MIP) is provided. The system includes an AT for, when it has entered a new network, generating a Security Parameter Index (SPI) and a security key for mutual authentication with a Home Agent (HA) of the new network, and for sending to the new network a registration request message including authentication information including the SPI, the authentication information being generated using the security key and a Home Agent (HA) for, upon receipt of the registration request message, searching a database for the SPI included in the authentication information, verifying the authentication information according to the search result, and upon successful verification of the authentication information, for generating mobility binding information of the AT, and for sending a registration response message including the HA's IP address to the AT.

According to further another aspect of the present invention, a method for managing mobility of an Access Terminal (AT) in a Home Agent (HA) for a mobile communication system using a Mobile Internet Protocol (MIP) is provided. The method includes receiving, from an AT that has entered a new network, a registration request message including authentication information including a Security Parameter Index (SPI) for mutual authentication, searching a database for the SPI included in the authentication information, and verifying authentication information according to the search result, and upon successful verification of the authentication information, generating mobility binding information of the AT, and sending a registration response message including the AT's IP address.

According to yet another aspect of the present invention, a mobility management method performed in an Access Terminal (AT) for a mobile communication system using a Mobile Internet Protocol (MIP) is provided. The method includes, when the AT has entered a new network, generating a Security Parameter Index (SPI) and a security key for mutual authentication with a Home Agent (HA) of the new network, sending to the new network a registration request message including a first HA address and first authentication information including the SPI, the first authentication information being generated using the security key, when the HA has succeeded in verifying the first authentication information, receiving from the HA a registration response message including a second HA address and second authentication information for the mutual authentication, and when the first HA address is identical to the second HA address, verifying the second authentication information using the security key.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will become more apparent from the following description taken in conjunction with the accompanying drawings in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of known functions and configurations are omitted for clarity and conciseness. Terms used herein are defined based on functions in the exemplary embodiments of the present invention and may vary according to users, operators' intention or usual practices. Therefore, the definition of the terms should be made based on contents throughout the specification.

Exemplary embodiments of the present invention provide at least one of address allocation, call setup, and security for an AT by using Mobile IPv4 in a mobile communication system. Although a description will be given herein with reference to a 3GPP2-based UMB system, by way of example, the present invention can also be used in Evolved Packet Core (EPC), which is an evolved 3GPP mobile communication system, and/or an evolved WiMAX system. The present invention can also be used for the case where an AT moves to a network supporting another wireless access technology. Therefore, it would be obvious to those skilled in the art that the Mobile IPv4-based Internet communication method proposed by the present invention can be applied to other mobile communication systems having a similar technical basis and channel format with a slight modification, without departing from the spirit and scope of the present invention.

Exemplary embodiments of the present invention provide a method and system for managing addresses and mobility of an AT by using Mobile IPv4 in a mobile communication system. Exemplary embodiments of the present invention improve a Mobile IPv4-based security process and registration process to enable rapid and guaranteed mobility support even when an AT moves between heterogeneous networks supporting different access technologies.

Figure 1:
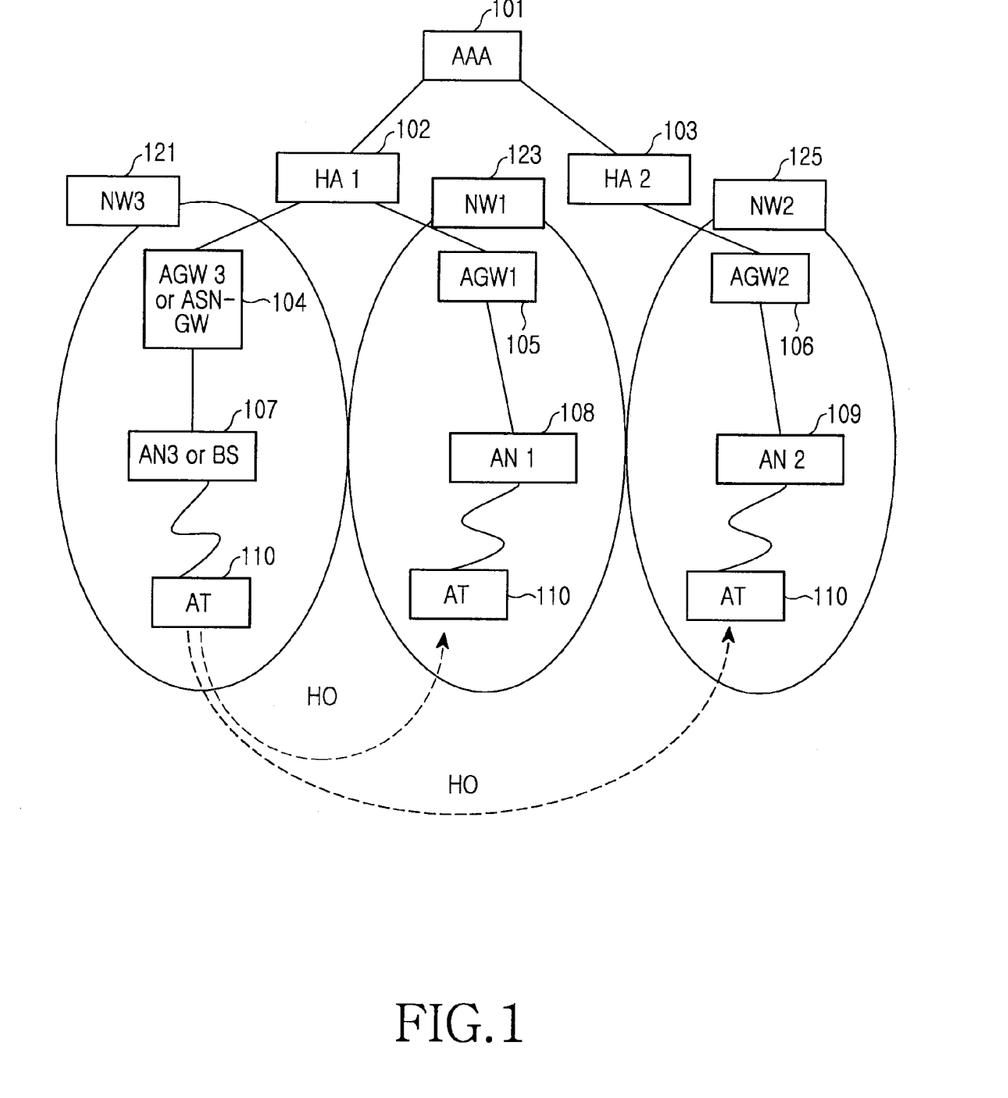
FIG. 1 is a block diagram illustrating a mobile communication system environment according to an exemplary embodiment of the present invention.

FIG. 1 is a block diagram illustrating a mobile communication system according to an exemplary embodiment of the present invention. In FIG. 1, a 3GPP2-based UMB system and a WiMAX system with overlapping coverage areas are illustrated as an example.

Referring to FIG. 1, Access Networks (ANs) 108 and 109 establish wireless connections to Access Terminals (ATs) 110 located in their service areas or cells, and perform communication with the ATs 110 through the wireless connections. The ANs 108 and 109 communicate with Access Gateways (AGWs) 105 and 106, or an Authentication, Authorization and Accounting (AAA) server 101 via a Signaling Radio Network Controller (SRNC; not shown).

In FIG. 1, the AT 110 refers to a user device that accesses a packet data network such as the Internet via the AN1 108 (AN2 109) and the AGW1 105 (AGW2 106). The AGW1 105 (AGW2 106) includes therein a Foreign Agent (FA) function (not shown) that takes charge of connecting the AT 110 to the packet data network when the AT 110 having another network as its home network has moved into a service area of a network 1 (NW1) 123 (or NW2 125) that the AGW1 105 (AGW2 106) manages.

Home Agents (HAs) 102 and 103, and the AAA server 101 are shown herein as the network entities of the packet data network.

On the assumption that a mobile communication system uses an Extensible Authentication Protocol (EAP) or a security framework for granting access of an AT, an exemplary embodiment of the present invention provides a method for granting use of Mobile IPv4 and performing security thereon using a security protocol such as AAA-based Remote Authentication Dial-in User Service (RADIUS) or Diameter AAA, which is a system supporting mobility and authentication using MIPv4, and an address allocation method thereof.

Between the AN1 108 (AN2 109) and the AGW1 105 (AGW2 106) there is an interface and data path for managing mobility of the AT 110. The AT 110 has a Mobile IPv4 protocol stack, and sends a request for its registration to the HA1 102 (HA2 103) through an initial call setup process of Mobile IPv4. The HA1 102 (HA2 103) allocates a Home of Address (HoA) of the AT 110 in response to the registration request message of the AT 110 in the call setup process.

Meanwhile, as illustrated in FIG. 1, a network 3 (NW3) 121, which may be a WiMAX system or a UMB system, includes an Access Service Network-Gateway (ASN-GW) or AGW3, which is a network entity denoted by reference numeral 104, and a Base Station (BS) or AN3, which is a network entity denoted by reference numeral 107.

Referring to FIG. 1, the AT 110, which was under the control of the NW3 121, moves to the NW1 123 (or NW2 125) which may be a UMB network, through a handoff. The NW1 123 (NW2 125), as described above, includes the AGW1 105 (AGW2 106) and the AN1 108 (AN2 109). The AGW1 105 of the NW1 123 shares the HA1 102 with the NW3 121, and the AGW2 106 of the NW2 125, unlike the NW3 121, is managed by the HA2 103.

In order to rapidly perform a registration procedure while maintaining the session even though the wireless access technologies of networks are different in there implementations of a registration procedure for mobility of the AT 110, it is preferable that the same HA as that used in the initial (old) network is maintained in a new network during registration of the AT 110 so that the information in the initial network can be shared. For example, in the case where the AT 110 moves from the NW3 121 to the NW1 123, if the NW3 121 and the NW1 123 share the HA1 102, the AT 110 can continue to use the HA information (i.e., IP address of HA) of the HA1 102 that was used during registration by the ASN-GW 104 of the NW3 121, during registration by the AGW1 105 of the NW1 123.

In this case, the AT 110 can move between the networks while continuously maintaining the HA information used in the initial network. The ASN-GW 104 and the AGW1 105 share the HA1 102, and the AGW1 105 can obtain HA information of the HA1 102 through an EAP process during initial access authentication, or can obtain the HA information from the ASN-GW 104. However, since the detailed procedure in which the AGW1 105 obtains the HA information of the initial network departs from the scope of the present invention, a detailed description thereof will be omitted herein.

On the other hand, when the AT 110 moves from the NW3 121 to the NW2 125 (they do not share the HA as illustrated in FIG. 1), for mobility registration, the AT 110 generates a Registration Request (RRQ) message including HA x.x.x.x using the HA address (e.g., x.x.x.x) that it already knows, or generates an RRQ message including, for example, HA 0.0.0.0 as the HA address, when it has no information on the HA address. When the HA address (e.g., y.y.y.y) obtained in an EAP process during initial authentication of the AT 110 or in other authentication process is different from the HA address used in the initial network of the AT 110, the AGW2 106 of the NW2 125 sends an RRQ message including HA y.y.y.y as the HA address to the HA2 103.

Figure 2:
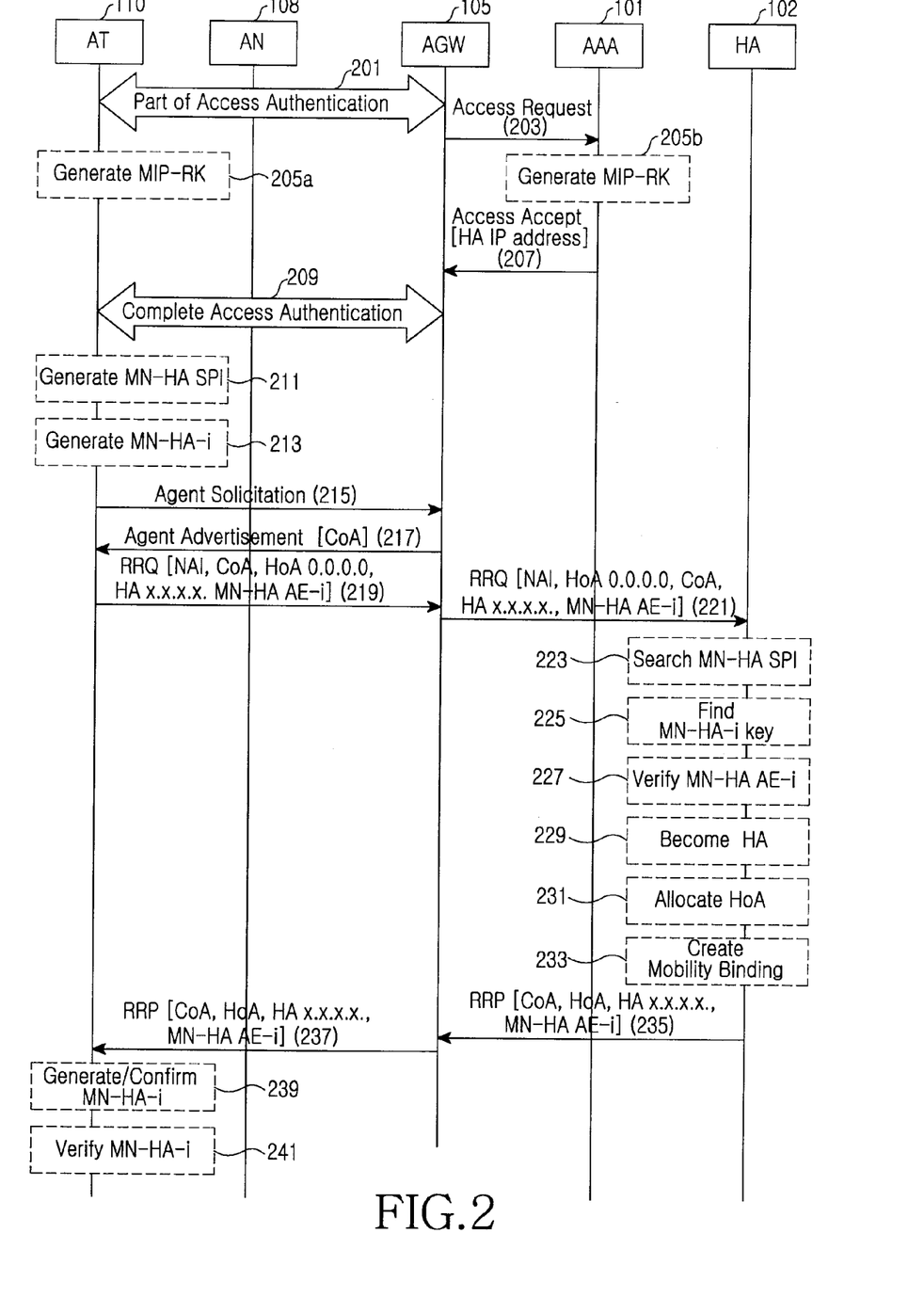
FIG. 2 is a message flow diagram illustrating a registration and security procedure for an AT according to an exemplary embodiment of the present invention.

FIG. 2 is a message flow diagram illustrating a registration and security procedure for an AT according to an exemplary embodiment of the present invention. The procedure shown herein is for a case where the AT 110 performs a handoff from the NW3 121 to the NW1 123, or a case where the AT 110 has HA information of a new network allocated according to the pre-configuration policy of the service provider.

For the sake convenience, although UMB network names such as the AGW3 104 and the AN3 107 will be used herein, assuming that the NW3 121 is a UMB network, if the AT 110 can acquire HA information in a new network from the ASN-GW, it is possible to apply the procedure of FIG. 2 to the WiMAX network or another network system supporting Mobile IP.

Referring to FIG. 2, in step 201, the AT 110 enters from the NW3 121 into the NW1 123, initializes an EAP-based access authentication process of the AT 110 with the AN 108 and AGW 105 of the NW1 123, and performs an initial portion of the authentication process. The access authentication process includes several procedures performed by a number of entities. The access authentication process is not specifically related to the exemplary embodiments of present invention described herein and therefore a detailed description thereof will be omitted. During the access authentication process, the AGW 105 sends, in step 203, an Access Request message to the AAA server 101 to notify of the receipt of an access authentication request from the AT 110. The Access Request message refers to an AAA access request message based on the RADIUS protocol or Diameter AAA protocol.

In steps 205a and 205b, security keys are generated, which will be used by the AT 110, the HA 102 and the AGW 105 for mutual authentication. Since a detailed generation method for the security keys is not related to the exemplary embodiments of the present invention described herein, a description thereof will be omitted. Specifically, the AT 110 and the AAA server 101 each generate a Mobile IP-Root Key (MIP-RK) which will be used for the entire authentication process of Mobile IPv4. The MIP-RK is used for generating at least one key such as a Mobile Node-Home Agent-initial (MN-HA-i) key that is a key for mutual authentication between the AT 110 and the HA 102, and this key is generated for MIPv4. The MIP-RK can be generated as different values for MIPv6 and MIPv4, or can be generated as the same value.

In step 207, the AAA server 101 sends an Access Accept message to the AGW 105 in response to the Access Request message. The Access Accept message includes therein an HA IP address used for identifying the HA 102. The Access Accept message refers to a response message based on the RADIUS protocol or Diameter AAA protocol. Thereafter, in step 209, the remaining process of the access authentication in which the AT 110, the AN 108, the SRNC (not shown) and the AGW 105 are involved is performed, thereby completing the access authentication process.

After the access authentication process has completed, the AT 110 generates, in step 211, an MN-HA Security Parameter Index (SPI) used for selecting an authentication algorithm and a security key. The MN-HA SPI is a value included in an Authentication Extension (AE) option used for mutual authentication between the AT 110 and the HA 102.

For example, the MN-HA SPI may be calculated by Equation (1) using the MIP-RK generated in step 205.

$$\text{MN-HA SPI} = \text{the } K \text{ most significant bytes of HMAC-SHA256 (MIP-RK, ``SPI-for MIPv4 MN-HA'')} \quad (1)$$

That is, MN-HA SPI is determined as the K Most Significant Bit (MSB) bits of an output value of a hash function that has a MIP-RK and a preset text (e.g., "SPI-for MIPv4 MN-HA") as its inputs, where K is a preset integer. Hashed Message Authentication Code (HMAC)-Secure Hash Algorithm 256 (SHA256), one of the standard encryption algorithms, can be used as the hash function.

As another example, MN-HA SPI may be found by Equation (2).

$$\text{MN-HA SPI} = \text{the } K \text{ most significant bytes of KDF (EMSK, ``SPI-for MIPv4 MN-HA'')} \quad (2)$$

That is, MN-HA SPI is determined as the K MSB bits of an output value of a Key Derivation Function (KDF) that has an Enhanced Master Key (EMSK) and a preset text (e.g., "SPI-for MIPv4 MN-HA") as its inputs, where K is a preset integer. EMSK, which refers to an enhanced master session key, is acquired in the access authentication process.

In step 213, the AT 110 generates an MN-HA-i key used for mutual authentication between the AT 110 and the HA 102. For example, the MN-HA-i key may be calculated by Equation (3).

$$\text{MN-HA-}i = \text{KDF (MIP-RK, "CMIP MN-HA", HA IP address, NAI, RRQ message ID)} \quad (3)$$

That is, the MN-HA-i key may be determined as an output value of a KDF that has, as its inputs, the MIP-RK generated in step 205, a preset text (e.g., "CMIP MN-HA"), HA's IP address obtained from an RRQ message, an AT's Network Access Identifier (NAI), and a message ID of the RRQ message. HMAC-SHA1 or HMAC-SHA256 can be used as the KDF.

In generating the MN-HA-i key, the RRQ message ID can be optionally used. That is, in order for the RRQ message ID to be used when the AT 110 or the AAA server 101 generates the MN-HA-i key, the RRQ message ID should be included in an Access Request message that the HA 102 sends to the AAA server 101. However, when the RRQ message ID is not included in the Access Request message, the AT 110 or the AAA server 101 calculates an MN-HA-i key using the remaining parameters except for the RRQ message ID in Equation (3). Unlike the horizontal handoff where the AT moves between cells in the network having the same characteristic, inter-network handoff, i.e., vertical handoff, is made, when the AT moves from one network to another network in the heterogeneous networks using access technologies.

Although the AT 110 generates in FIG. 2 the MN-HA SPI and the MN-HA-i key in steps 211 and 213 after the access authentication process has completed, the AT 110 can generate the MN-HA SPI or the MN-HA-i key anytime the parameters necessary for generating the MN-HA SPI or the MN-HA-i key are available during the access authentication process.

In step 215, the AT 110 sends an Agent Solicitation message to the AGW 105 to find an FA necessary for generating a Care of Address (CoA) to be used in the new network (i.e., NW1 123). When the AGW 105 has an FA function, the AGW 105 generates in step 217 a CoA for the AT 110, and sends the CoA to the AT 110 along with an Agent Advertisement message.

In step 219, the AT 110 sends to the AGW 105 an RRQ message used for registering in the HA 102 the information indicating that it is located in the NW1 123. The RRQ message includes a NAI for identifying the AT 110, the CoA, HoA 0.0.0.0 configured as 0.0.0.0 to request allocation of a HoA of the AT 110, HA x.x.x.x which is an HA field including an IP address of the HA 102 that the AT 110 has already known, and an MN-HA AE-initial (MN-HA AE-i) which is authentication information for mutual authentication between the AT 110 and the HA 102. Herein, the CoA is a temporary address (CoA) that the AT 110 will use in the NW1 123 which is a foreign network, and the HoA 0.0.0.0 is given by temporarily setting a HoA field of the RRQ message as 0.0.0.0. The MN-HA AE-i, which is an AE value calculated using the MN-HA-i key, includes at least one parameter. In addition, the MN-HA AE-i of the RRQ message includes therein the MN-HA SPI used for finding a key necessary for verifying the AE value. In step 221, the AGW 105 forwards the RRQ message to the HA 102.

In step 223, the HA 102 searches a database of the HA 102 for an MN-HA SPI included in the MN-HA AE-i of the RRQ message. Since the HA 102 is shared by the NW3 121 and the NW1 123, the HA 102 already has the MN-HA SPI that the AT 110 has registered in the NW3 121. Therefore, when the MN-HA SPI is determined, the HA 102 finds in step 225 an MN-HA-i key, using the MN-HA SPI as an index. That is, since the HA 102 stores the registered MN-HA-i key of the AT 110, using the MN-HA SPI as an index, the MN-HA SPI is used to find the MN-HA-i key. After finding the MN-HA-i key, the HA 102 verifies in step 227 the MN-HA AE-i extracted from the RRQ message using the found MN-HA-i key. That is, the HA 102 determines if the AT 110 is an authenticated AT by verifying an AE value of the MN-HA AE-i delivered in the RRQ message with the found MN-HA-i key. Upon its success in verifying the MN-HA AE-i using the found MN-HA-i key, the HA 102 determines to operate as an HA for the AT 110 in step 229, allocates a HoA for the AT 110 in step 231, and generates and stores Mobility Binding information composed of CoA and HoA of the AT 110 in step 233, thereby managing the moving situation of the AT 110.

In step 235, the HA 102 sends to the AGW 105 a Registration Response (RRP) message targeting the AT 110, in response to the RRQ message, and the RRP message includes therein the HoA that the HA 102 allocated for the AT 110, and the CoA which was received in the RRQ message from the AT 110, thereby notifying that the CoA transmitted by the AT 110 and the HoA allocated by the HA 102 are registered together.

In addition, the RRP message includes therein an HA field including an HA address and an MN-HA AE-i for mutual authentication between the AT 110 and the HA 102, and the HA address is an IP address of the HA 102, that has already been allocated for the AT 110. In the exemplary embodiment of FIG. 2, since the HA address that the AT 110 has is already known, the HA address that the AGW 105 has is already known or was allocated to the AGW 105 for the AT 110, and the already allocated HA address are all equal to x.x.x.x., In addition, the HA field of the RRP message is set as x.x.x.x. As for the MN-HA AE-i of the RRP message, the HA 102 generated it to check mutual authentication between the AT 110 and the HA 102, and in the exemplary embodiment of FIG. 2, since the MN-HA-i key determined by the HA 102 is equal to the MN-HA-i key sent in the RRQ message by the AT 110, the key included in the RRP message is equal to the key included in the RRQ message.

In step 237, the AGW 105 relays the RRP message received from the HA 102 to the AT 110. In step 239, the AT 110 generates an MN-HA-i key using the HA address in the RRP message, or confirms if it is equal to its known MN-HA-i key. That is, if the HA address of the HA field included in the RRQ message is equal to the HA address of the HA field included in the RRP message, the AT 110 simply confirms the MN-HA-i key generated in step 213, without generating the MN-HA-i key. However, if the HA addresses are unequal, the AT 110 generates the MN-HA-i key. If the MN-HA-i key is generated or confirmed, the AT 110 verifies in step 241 the MN-HA AE-i included in the RRP message using the MN-HA-i key, thereby determining that its registration has been successfully completed as the AT 110 is authenticated by the HA 102.

Figure 3:
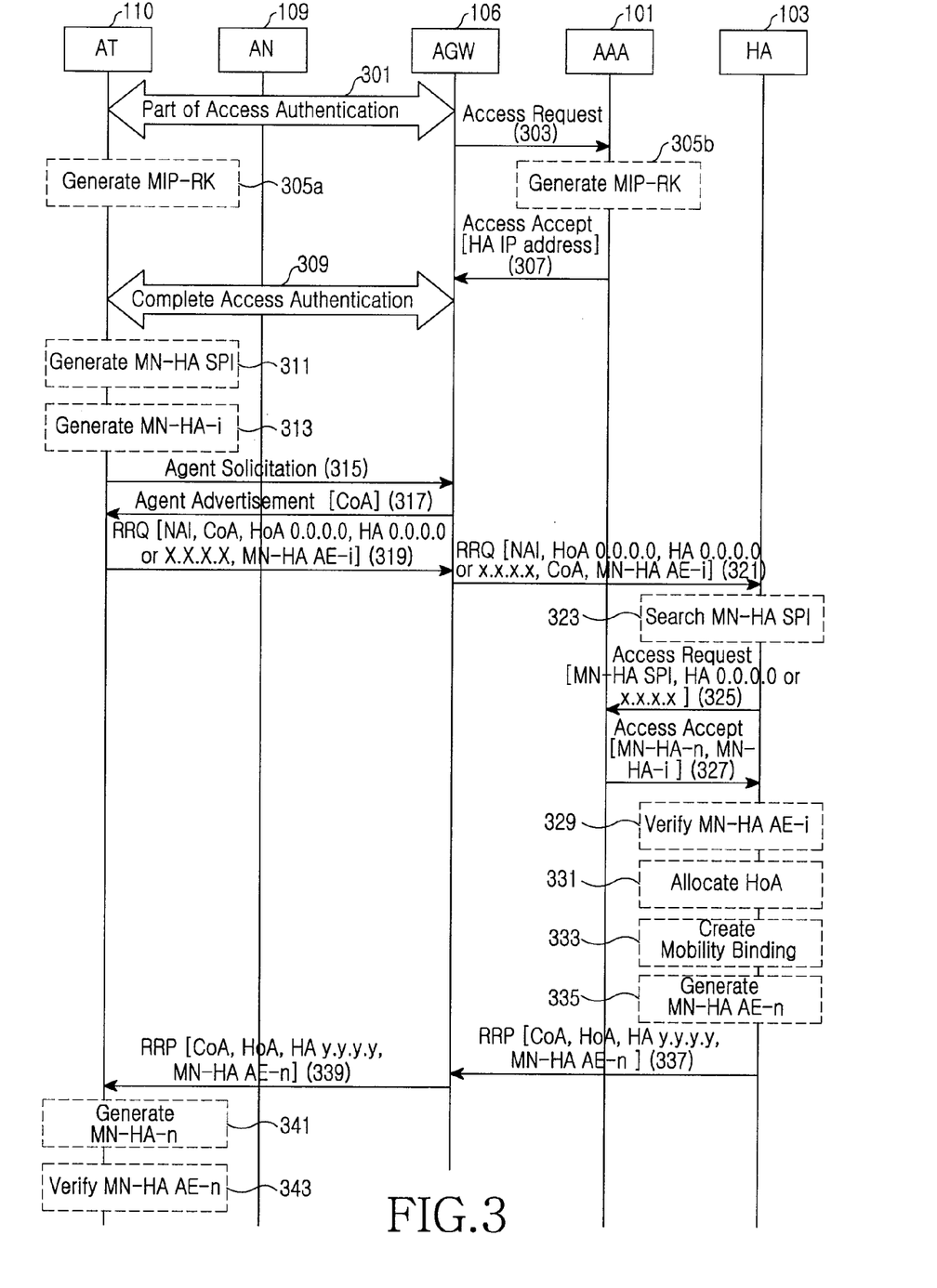
FIG. 3 is a message flow diagram illustrating a registration and security procedure for an AT according to an exemplary embodiment of the present invention.

FIG. 3 is a message flow diagram illustrating a registration and security procedure for an AT according to an exemplary embodiment of the present invention. Shown herein is a procedure for a case where as the AT 110 makes a handoff from the NW3 121 to the NW2 125, the HA information that the AT 110 already has is different from the HA 103 already allocated for the AT 110, or the AT 110 has no information on the HA allocated in the NW2 125 which is a new network.

For the sake of convenience, although UMB network names such as the AGWs 105 and 106, and the ANs 108 and 109 will be used herein for the NW1 123 and the NW2 125, if the AT 110 has no information on the HA in the new network, or if the HA information is different from the HA information it already has, it is possible to apply the procedure of FIG. 3 not only to the WiMAX network, but also to another network system supporting Mobile IP.

Referring to FIG. 3, in step 301, the AT 110 enters from the NW3 121 into the NW2 125, initializes an EAP-based access authentication process of the AT 110 with the AN 109 and the AGW 106 of the NW2 125, and performs an initial portion of the authentication process. During the access authentication process, the AGW 106 sends, in step 303, an Access Request message to the AAA server 101 to notify of the receipt of an access authentication request from the AT 110.

In steps 305a and 305b, security keys are generated, which will be used by the AT 110, the HA 103 and the AGW 106 for mutual authentication. Specifically, the AT 110 and the AAA server 101 each generate a MIP-RK that will be used for the entire authentication process of Mobile IP. The MIP-RK is used for generating at least one key such as a MN-HA-i key that is a key for mutual authentication between the AT 110 and the HA 103.

In step 307, the AAA server 101 sends an Access Accept message to the AGW 106 in response to the Access Request message. The Access Accept message includes therein an HA IP address used for identifying the HA 103. Thereafter, in step 309, the remaining process of the access authentication in which the AT 110, the AN 109, the SRNC (not shown) and the AGW 106 are involved is performed, thereby completing the access authentication process.

After the access authentication process has completed, the AT 110 generates, in step 311, an MN-HA SPI used for selecting an authentication algorithm and a security key. The MN-HA SPI is a parameter included in an AE option used for mutual authentication between the AT 110 and the HA 103. For example, the MN-HA SPI may be calculated by Equation (1) or Equation (2) using the MIP-RK generated in step 305.

In step 313, the AT 110 generates an MN-HA-i key used by the AT 110 and the HA 103 for mutual authentication. For example, the MN-HA-i key may be calculated by Equation (3).

Referring to FIG. 3, although the AT 110 generates the MN-HA SPI and the MN-HA-i key in steps 311 and 313 after the access authentication process has completed, the AT 110 can generate the MN-HA SPI or the MN-HA-i key anytime the parameters necessary for generating the MN-HA SPI or the MN-HA-i key are available during the access authentication process.

In step 315, the AT 110 sends an Agent Solicitation message to the AGW 106 to find an FA necessary for generation of a CoA to be used in the new network (i.e., NW2 125). When the AGW 106 has an FA function, the AGW 106 generates in step 317 a CoA for the AT 110, and sends the CoA to the AT 110 along with an Agent Advertisement message.

In step 319, the AT 110 sends to the AGW 106 an RRQ message used for registering in the HA 103 the information indicating that it is located in the NW2 125. The RRQ message includes a NAI for identifying the AT 110, the CoA, a HoA 0.0.0.0 configured as 0.0.0.0 to request allocation of a HoA of the AT 110, an HA field configured as an IP address of the HA 102 that the AT 110 already knows, and an MN-HA AE-i for mutual authentication between the AT 110 and the HA 103. Herein, the CoA is a temporary address that the AT will use in the NW2 125 which is a foreign network, and the HoA 0.0.0.0 is given by temporarily setting a HoA field of the RRQ message as 0.0.0.0. When the AT 110 has HA information for the HA 102 of the initial network, the HA field is set as the IP address x.x.x.x of the HA 102, and when the AT 110 has no HA information, the HA field is set as 0.0.0.0. The MN-HA AE-i, which is an AE value calculated using the MN-HA-i key, includes at least one parameter. In addition, the MN-HA AE-i of the RRQ message includes therein the MN-HA SPI used for finding a key necessary for verifying the AE value. In step 321, the AGW 106 forwards the RRQ message to the HA 103.

In step 323, the HA 103 searches a database of the HA 103 for an MN-HA SPI included in the MN-HA AE-i of the RRQ message. Since the HA 103 is different from the HA 102 of the NW3 121, the HA 103 does not have an MN-HA SPI associated with the AT 110. Therefore, when no MN-HA SPI is discovered, the HA 103 sends in step 325 an Access Request message for requesting authentication of the AT 110, to the AAA server 101, and the Access Request message, even though the actual address of the HA 103 is y.y.y.y, includes the MN-HA SPI included in the RRQ message and the address 0.0.0.0 or x.x.x.x included in the HA field.

If it is determined that the AT 110 has been authenticated through the AAA server 101, the AAA server 101 generates an MN-HA-i key and an MN-HA-new (MN-HA-n) key for the AT 110. These keys may be generated by Equation (3) and Equation (4), respectively. When the AAA server 101 uses Equation (3) to generate the MN-HA-i key, and uses an RRQ message ID as an input parameter of Equation (3), the RRQ message ID is included in the Access Request message. However, when the AAA server 101 does not use the RRQ message ID, no RRQ message ID is included in the Access Request message.

$$\text{MN-HA-}n = \text{KDF (MIP-RK, "CMIP MN-HA", HA IP address, NAI, RRQ message ID)} \quad (4)$$

That is, the MN-HA-n key is determined as an output value of a KDF that has, as its inputs, the MIP-RK generated in step 305, a preset text "CMIP MN-HA", an HA's IP address obtained from the RRQ message, a NAI of an AT, and an RRQ message ID. HMAC-SHA1 or HMAC-SHA256 can be used as the KDF.

The MN-HA-i key is used for verifying the MN-HA AE-i for mutual authentication between the AT 110 and the HA 103, and the MN-HA-n key is used for verifying the authentication information MN-HA AE-new (MN-HA AE-n) generated by the HA 103. In step 327, the AAA server 101 sends the MN-HA-i key and the MN-HA-n key to the HA 103 along with an Access Accept message in response to the Access Request message.

In step 329, the HA 103 verifies the MN-HA AE-i extracted from the RRQ message using the MN-HA-i key received through the Access Accept message. That is, the HA 103 determines if the AT 110 is an authenticated AT by verifying an AE value of the MN-HA AE-i delivered in the RRQ message with the MN-HA-i key. When it is determined that the AT 110 has been authenticated, the HA 103 allocates a HoA for the AT 110 in step 331, and generates and stores Mobility Binding information composed of CoA and HoA of the AT 110 in step 333, thereby managing the moving situation of the AT 110.

In step 335, the HA 103 generates an MN-HA AE-n using an IP address of the HA 103, which was actually allocated to the AT 110. In step 337, the HA 103 sends an RRP message targeting the AT 110, to the AGW 106 in response to the RRQ message, and the RRP message includes therein the HoA that the HA 103 allocated for the AT 110, and the CoA which was delivered in the RRQ message from the AT 110, thereby notifying that the CoA transmitted by the AT 110 and the HoA allocated by the HA 103 are registered together.

In addition, the RRP message includes therein an HA address and an MN-HA AE-n for mutual authentication between the AT 1 10 and the HA 103, and the HA address is an IP address of the HA 103, actually allocated for the AT 110. In the exemplary embodiment of FIG. 3, since the AT 110 sends the RRQ message to HA 0.0.0.0, as the HA address x.x.x.x that the AT 110 already knows, the HA address y.y.y.y that the AGW 106 already knows or that has already been allocated to the AGW 106 for the AT 110, and the already allocated HA address y.y.y.y are different from each other, or if the AT 110 has no information on the HA address, the HA field included in the RRP message is set as the already allocated HA address HA y.y.y.y.

In step 339, the AGW 106 relays the RRP message received from the HA 103 to the AT 110. The AT 110 generates an MN-HA-n key by Equation (4) using the HA address in the RRP message in step 341, and verifies an MN-HA AE-n in the RRP message using the generated MN-HA-n key in step 343, thereby determining that its registration has been successfully completed as the AT 110 is authenticated by the HA 103.

Figure 4A:
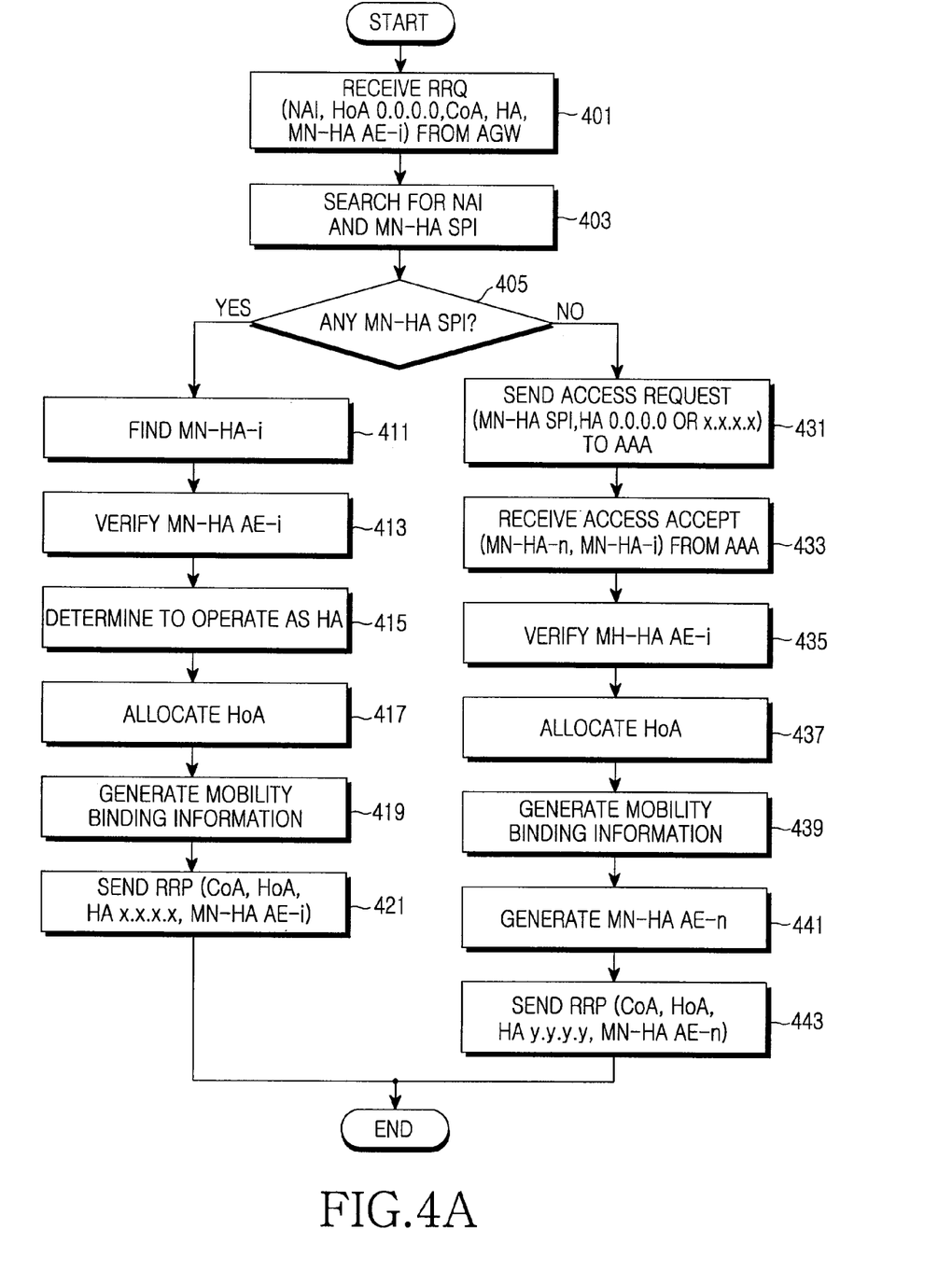
FIGS. 4A and 4B are flowcharts illustrating an operation of an HA according to an exemplary embodiment of the present invention.

FIG. 4A is a flowchart illustrating an operation of an HA according to an exemplary embodiment of the present invention.

Referring to FIG. 4A, the HA receives an RRQ message of an AT, relayed from an AGW in step 401. The RRQ message includes therein at least one of NAI, HoA, HA address, CoA, and MN-HA AE-i. When CoA and HoA of the RRQ message are set as 0.0.0.0, it means that the HA can allocate a HoA of the AT. When the AT knows an HA in which it will be registered, or when the AT sends the RRQ message after determining to send a registration request to a particular HA, the RRQ message includes an HA x.x.x.x of the corresponding HA. When the AT has no information on an IP address of the HA in which it will be registered, an HA field of the RRQ message is set as 0.0.0.0. Therefore, the HA address in the RRQ message that the HA received may be different from the IP address of the HA that received the RRQ message. For example, while the HA address in the RRQ message is x.x.x.x or 0.0.0.0, the IP address of the HA that received the RRQ message may be x.x.x.x or y.y.y.y. In addition, the MN-HA AE-i to be used for mutual authentication between the AT and the HA, which is derived from the MN-HA-i key in relation to authentication, is included in the RRQ message.

In step 403, the HA searches its database for Mobility Binding information activated for the AT corresponding to a NAI extracted from the RRQ message, or searches the database for the MN-HA SPI extracted from the MN-HA AE-i of the RRQ message. The HA proceeds to steps 411 to 421, or to steps 431 to 443 according to the presence/absence of the MN-HA SPI in the database in step 405.

When the MN-HA SPI included in the MN-HA AE-i of the RRQ message is determined to be in the database, the HA proceeds to step 411 where it finds an MN-HA-i key stored in the database according to the MN-HA SPI. The MN-HA-i key is a key that the AT and HA set during initial authentication for their mutual authentication. After finding the MN-HA-i key, the HA verifies in step 413 the MN-HA AE-i of the RRQ message based on the MN-HA-i key. Upon successful verification of the MN-HA AE-i, the HA determines to operate as an HA for the AT that sent the RRQ message in step 415, allocates a HoA for the AT in step 417, and generates and stores Mobility Binding information for the AT to manage the mobility of the AT in step 419. Thereafter, in step 421, the HA generates an RRP message including at least one of CoA, HoA, HA address and MN-HA AE-i, and sends it to the AT through a relay of the AGW in response to the RRQ message.

However, when the MN-HA SPI included in the MN-HA AE-i of the RRQ message is not determined to be in the database, the HA proceeds to step 431 where it sends an Access Request message for requesting access acceptance of the AT to the AAA server. The Access Request message includes therein an HA field and the MN-HA SPI that the HA intends to find, and the HA field is set as an HA address in the "HA field" included in the RRQ message. For example, the HA field may be set as 0.0.0.0 or x.x.x.x.

In step 433, the HA receives the MN-HA-n key and MN-HA-i key related to the AT from the AAA server through an Access Accept message from the AAA server. The MN-HA-n key is a new key that the AAA server generates and sends to the HA for mutual authentication between the AT and the HA, and this key is generated using the HA's IP address allocated for the AT as an input parameter. For example, an IP address y.y.y.y of the HA that has already received an RRQ message can be used as the IP address of the HA. The MN-HA-i key is a key that the AAA server generates and sends to the HA to verify the MN-HA AE-i transmitted from the AT, and the HA address 0.0.0.0 or x.x.x.x in the "HA field" of the RRQ message sent from the AT to the HA is used as an input parameter for generation of the MN-HA-i key. In step 435, the HA verifies the MN-HA AE-i extracted from the RRQ message using the MN-HA-i key, to thereby determine if the AT has been authenticated.

When the AT has been authentication, the HA allocates a HoA for the AT in step 437, and generates and stores Mobility Binding information including CoA and HoA for the AT in step 439. Thereafter, the HA generates an MN-HA AE-n for mutual authentication between the AT and the HA using the MN-HA-n key in step 441, and sends the MN-HA AE-n to the AT along with the RRP message through a relay of the AGW in step 443. The RRP message includes therein a CoA that the AT sent in the RRQ message, together with the HoA that the AT will use. In addition, the HA's IP address y.y.y.y already allocated for the AT is also included in the RRP message.

Figure 4B:
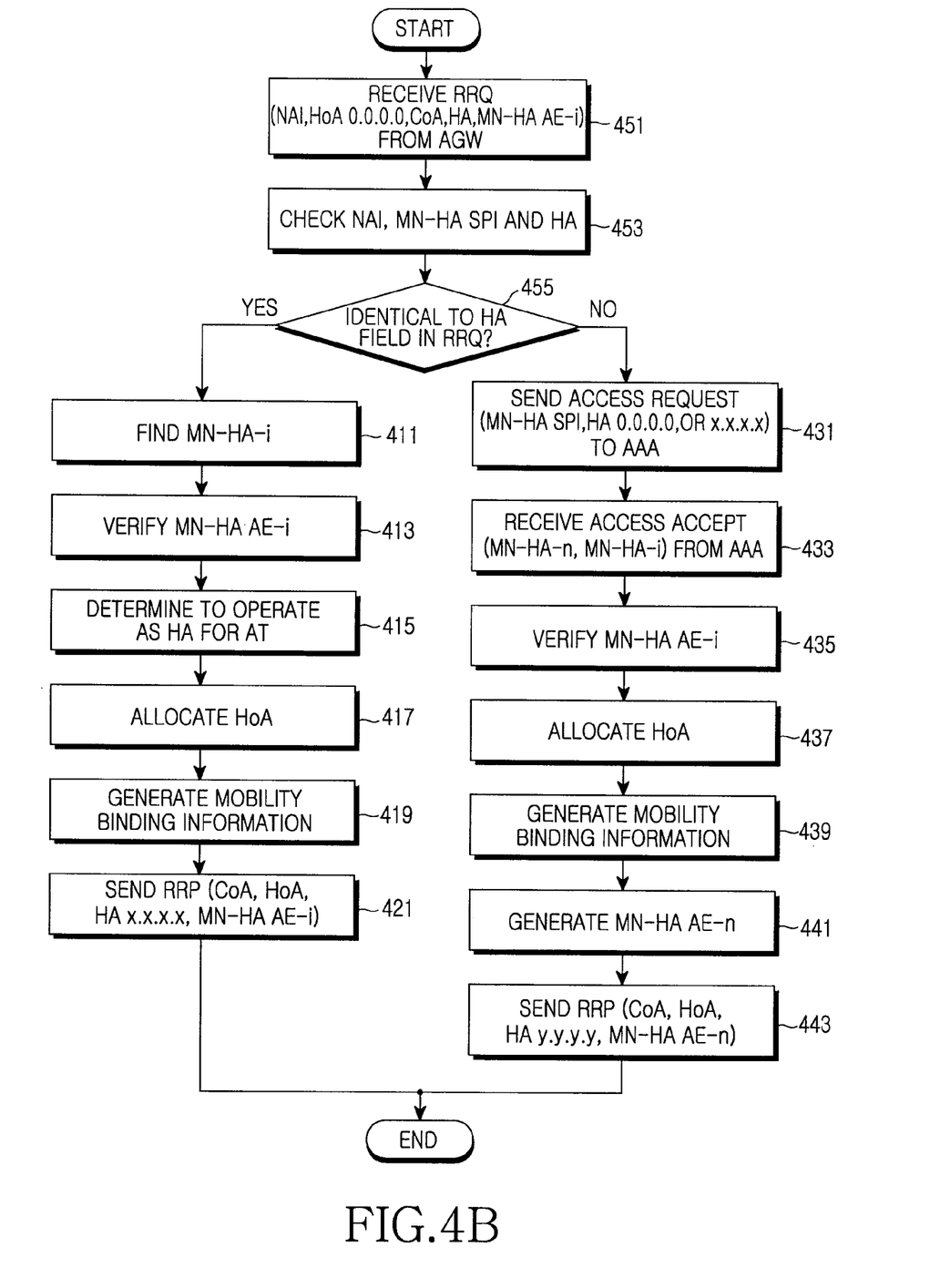

FIG. 4B is a flowchart illustrating an operation of an HA according to an exemplary embodiment of the present invention.

Referring to FIG. 4B, the HA receives an RRQ message of the AT, relayed from the AGW in step 451. The RRQ message includes therein at least one of NAI, HoA, HA address, CoA and MN-HA AE-i. In addition, the MN-HA AE-i to be used for mutual authentication between the AT and the HA, which is derived from the MN-HA-i key in relation to authentication, is included in the RRQ message. In step 453, the HA checks the "HA field" of the RRQ message, and determines in step 455 if the HA field includes an IP address of the HA. The HA proceeds to step 411 or step 431 according to whether the HA address in the HA field is equal to the IP address of the HA. If the HA field includes the IP address of the HA, the HA proceeds to steps 411 to 421 where it operates as described above. However, if the HA field does not include the IP address of the HA, the HA proceeds to step 431 to 443 where it operates as described above with respect to FIG. 4A.

Figure 5:
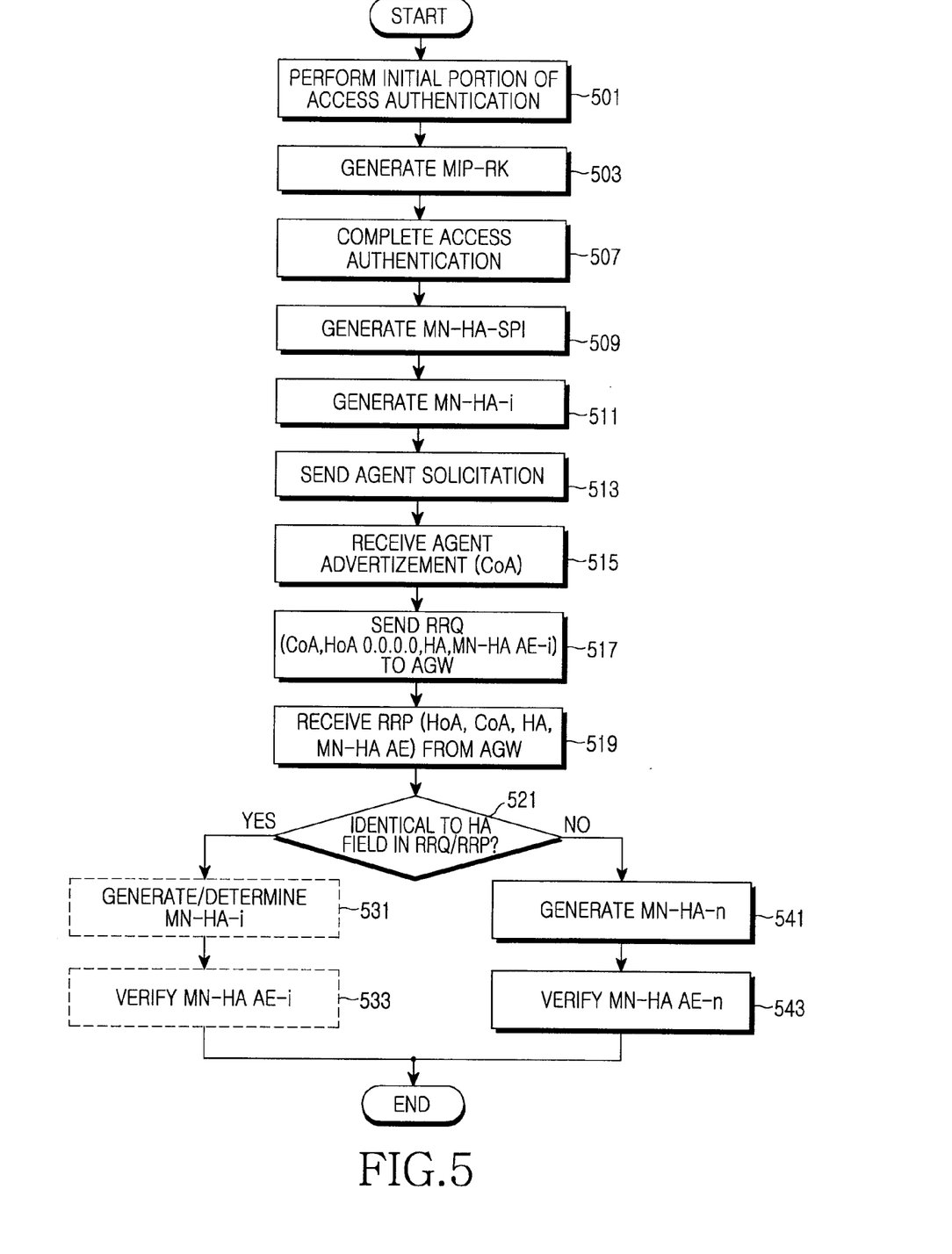
FIG. 5 is a flowchart illustrating an operation of an AT according to an exemplary embodiment of the present invention.

FIG. 5 is a flowchart illustrating an operation of an AT according to an exemplary embodiment of the present invention.

Referring to FIG. 5, the AT performs an initial portion of an access authentication process in step 501. In step 503, the AT generates a MIP-RK that is a root key to be used for MIPv4 authentication. In step 507, the AT completes the remainder of the access authentication process, in which several entities such as AT, AGW and AAA server are involved. In step 509, the AT generates an MN-HA SPI using the MIP-RK or an EMSK acquired in the access authentication process. The MN-HA SPI is a value included in an MN-HA AE (MN-HA AE-i and/or MN-HA AE-n) which is authentication information used for mutual authentication between the AT and the HA, and this is used for selecting a key utilized for calculating an authentication value (authenticator) with an authentication algorithm.

In step 511, the AT generates from the MIP-RK a MN-HA-i key for mutual authentication between the AT and the HA. Meanwhile, if the AT can acquire an IP address of the HA through the authentication process, step 511 can be performed before step 509. In step 513, the AT sends an Agent Solicitation message to the AGW to find an FA for CoA generation. In step 515, the AT receives an Agent Advertisement message including the CoA assigned by the AGW having a FA function.

After acquiring the CoA through the Agent Advertisement message, the AT sends an RRQ message to the HA via the AGW in step 517. The RRQ message includes CoA, HoA 0.0.0.0, HA address, and MN-HA AE-i. When the AT knows an HA's IP address, the HA field is set as the IP address. However, when the AT does not know the HA's IP address, the HA field is set as 0.0.0.0 to request an HA's IP address to be allocated. In step 519, the AT receives an RRP message from the HA through a relay of the AGW. An HA's IP address included in the RRP message may be different from the HA address included in the RRQ message, and it indicates the HA which is already allocated to the AT.

In step 521, the AT determines if the IP address in the HA field sent in the RRQ message is equal to the IP address in the HA field included in the RRP message, and proceeds to steps 531 to 533, or 541 to 543 according to the result of the determination. In an exemplary embodiment of generating the MN-HA-n key based on the HA's IP address of the RRP message, the AT directly proceeds to steps 541 and 543 without the decision of step 521.

If the IP address in the HA field is equal, the AT generates in step 531 an MN-HA-i key using the MIP-RK and the HA's IP address. In an exemplary embodiment, since the IP address in the HA field is equal, the AT decides to use the MN-HA-i key generated in step 511 or the MN-HA-i key received through the RRP message, thereby determining that the MN-HA-i key generated in step 511 is equal to the MN-HA-i key received through the RRP message. In yet another exemplary embodiment, the AT compares the MN-HA-i key generated in step 511 with the MN-HA-i key received through the RRP message, and if they are equal, the AT determines to use the MN-HA-i key generated in step 511 or the MN-HA-i key received through the RRP message. In step 533, the AT verifies an MN-HA AE-i extracted from the RRP message using the generated/determined MN-HA-i key.

If the IP address in the HA field is not equal, the AT generates in step 541a new MN-HA-n key using the HA address in the HA field included in the RRP message. In step 543, the AT verifies the MN-HA AE-n extracted from the RRP message using the MN-HA-n key, for mutual authentication between the AT and the HA.

Figure 6:
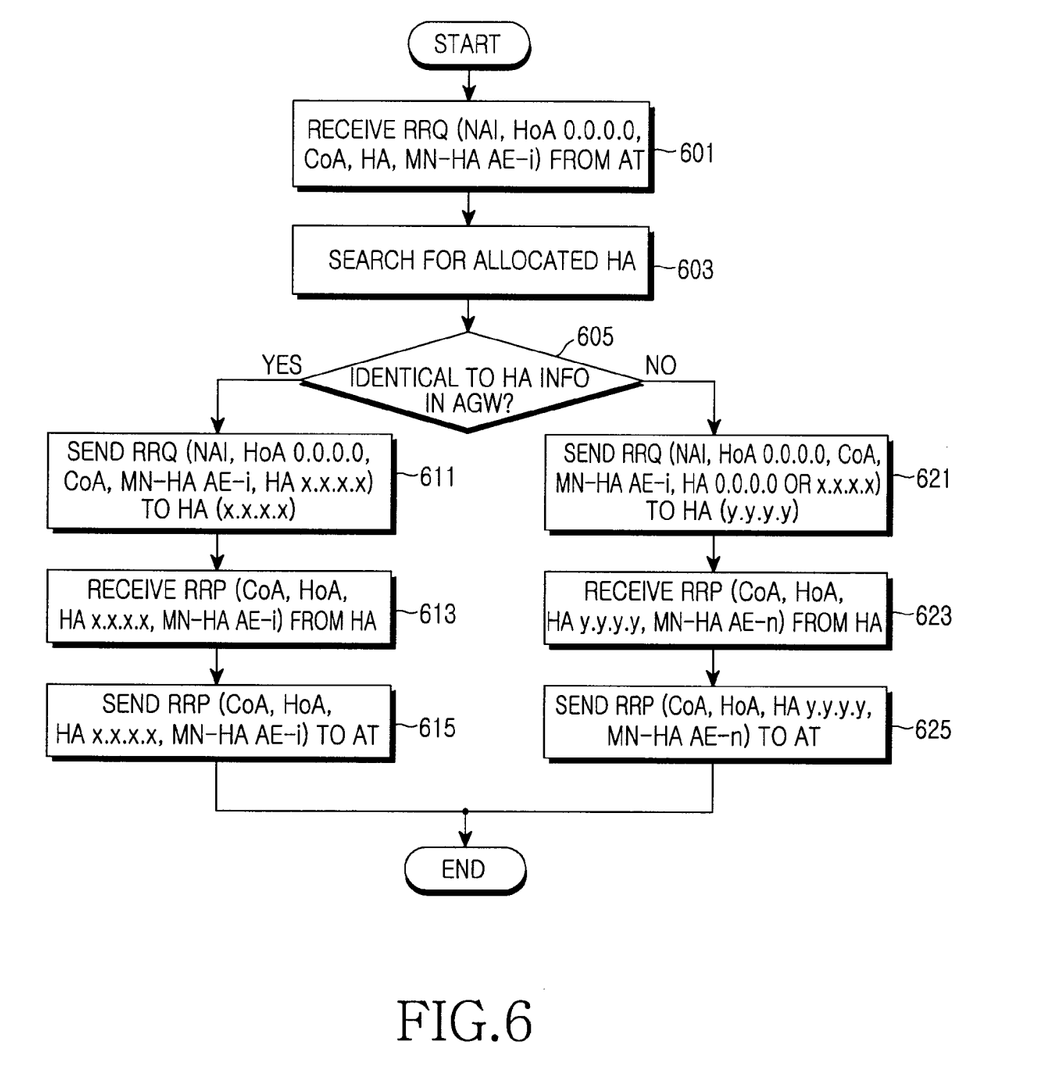
FIG. 6 is a flowchart illustrating an operation of an AGW according to an exemplary embodiment of the present invention.

FIG. 6 is a flowchart illustrating an operation of an AGW according to an exemplary embodiment of the present invention.

Referring to FIG. 6, the AGW receives an RRQ message from the AT in step 601. The RRQ message includes therein at least one of NAI, HoA, HA address, CoA, and MN-HA AE-i. In step 603, the AGW determines if there is any HA allocated in an access authentication process for the AT. In step 605, the AGW determines if HA information acquired in the access authentication process or HA information determined according to the pre-configuration policy of the service provider is equal to the IP address in the HA field included in the RRQ message.

If the HA information that the AGW has is equal to the IP address in the HA field included in the RRQ message, the AGW sends the RRQ message to the IP address of the known HA information in step 611. In step 613, the AGW receives an RRP message from the known HA. The RRP message includes therein the HoA that the AT will use, together with the CoA that the AT will send in the RRQ message. In addition, the HA's IP address, and the MN-HA AE-i verified by the HA are included in the RRP message. In step 615, the AGW delivers the RRP message to the AT.

However, if the HA information that the AGW has is different from the IP address in the HA field included in the RRQ message, the AGW delivers the RRQ message to an IP address, e.g., HA y.y.y.y, of the known HA information in step 621. In step 623, the AGW receives an RRP message from the HA in response to the RRQ message. The RRP message includes therein the HoA that the AT will use, and the CoA which was transmitted in the RRQ message. In addition, the HA's IP address and the MN-HA AE-n that the HA has newly generated using the MN-HA-n key are included in the RRP message. In step 625, the AGW delivers the RRP message to the AT.

As is apparent from the foregoing description, exemplary embodiments of the present invention address the call setup delay problem for data communication that occurs while performing a registration process to use Mobile IPv4 when the AT supporting Mobile IPv4 moves, and also resolves the time delay problem occurring in the call reestablishment process when the AT moves from one AN to another AN, e.g., from a UMB system to a WiMAX system. In addition, the mobile communication system using different Mobile IPv4-based access technologies efficiently performs the call setup and security processes, thereby rapidly and efficiently performing data communication.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for managing mobility of an Access Terminal (AT) in a mobile communication system using a Mobile Internet Protocol, the method comprising:
   performing, by the AT, an authentication process of the AT with an Access Gateway (AGW);
   sending, by the AT, an Agent Solicitation message to the AGW;
   sending, by the AGW, an Agent Advertise message including a Care of Address (CoA) to the AT in response to the Agent Solicitation message sent by the AT;
   sending, by the AT, a Registration Request (RRQ) message to the AGW;
   sending, by the AGW, the RRQ message to a Home Agent (HA);
   sending, by the HA, a Registration Response (RRP) message to the AGW;
   sending, by the AGW, the RRP message to the AT; and
   upon receipt of the RRP message, generating, by the AT, a Mobile Node (MN)-HA key and an MN-HA-Security Parameter Index (SPI).

2. The method of claim 1, further comprising:
   sending, by an Authentication, Authorization and Accounting (AAA) server, an HA Internet Protocol (IP) address.

3. The method of claim 1, wherein a new network that the AT has entered shares the HA with a home network to which the AT was connected.

4. The method of claim 1, wherein the RRQ message includes at least one of a Network Access Identifier (NAI) of the AT, the CoA for the AT to use in a new network, a Home of Address (HoA) that the HA allocated, a HA address, and an authentication information.

5. The method of claim 4, further comprising:
  upon receipt of the RRP message, searching, by the HA, a database for the MN-HA-SPI,
  when the MN-HA-SPI is determined to exist as a result of the searching, finding, by the HA, the MN-HA key using the MN-HA-SPI; and
  verifying the authentication information using the found MN-HA key.

6. The method of claim 1, wherein the RRP message includes at least one of a Network Access Identifier (NAI) of the AT, the CoA for the AT, a Home of Address (HoA) that the HA allocated, a HA address, and an authentication information.

7. A mobile communication system for managing mobility of an Access Terminal (AT) using a Mobile Internet Protocol, the system comprising:
  the AT for, performing an authentication process of the AT with an Access Gateway (AGW), sending an Agent Solicitation message to the AGW, receiving an Agent Advertise message including a Care of Address (CoA) from the AGW in response to the Agent Solicitation message sent to the AGW, sending a Registration Request (RRQ) message to the AGW, and receiving a Registration Response (RRP) message from the AGW, and generating a Mobile Node (MN)-HA key and an MN-HA-Security Parameter Index (SPI); and
  the AGW for, receiving the Agent Solicitation message from the AT, sending the Agent Advertise message including the CoA to the AT in response to the Agent Solicitation message received from the AT, receiving the RRQ message from the AT, sending the RRQ message to a Home Agent (HA), receiving the RRP message from the HA, and sending the RRP message to the AT.

8. The system of claim 7, wherein the AGW receives an HA Internet Protocol (IP) address.

9. The system of claim 7, wherein a new network that the AT has entered shares the HA with a home network to which the AT was connected.

10. The system of claim 7, wherein the RRQ message includes at least one of a Network Access Identifier (NAI) of the AT, the CoA for the AT, a Home of Address (HoA) that the HA allocated, a HA address, and an authentication information.

11. The system of claim 10, wherein upon receipt of the RRP message, the HA searches a database for the MN-HA-SPI, when the MN-HA-SPI is determined to exist as a search result, finds the MN-HA key using the MN-HA-SPI, and verifies the authentication information using the found MN-HA key.

12. The method of claim 7, wherein the RRP message includes at least one of a Network Access Identifier (NAI) of the AT, the CoA for the AT to use in a new network, a Home of Address (HoA) that the HA allocated, a HA address, and an authentication information.

13. A method for managing mobility of an Access Terminal (AT) in the AT for a mobile communication system using a Mobile Internet Protocol, the method comprising:
  performing an authentication process of the AT with an Access Gateway (AGW);
  sending an Agent Solicitation message to the AGW;
  receiving an Agent Advertise message including a Care of Address (CoA) from the AGW in response to the Agent Solicitation message;
  sending a Registration Request (RRQ) message to the AGW; and
  receiving a Registration Response (RRP) message from the AGW; and
  generating a Mobile Node (MN)-Home Agent (HA) key and an MN-HA-Security Parameter Index (SPI).

14. The method of claim 13, wherein a new network that the AT has entered shares a Home Agent (HA) with a home network to which the AT was connected.

15. The method of claim 13, wherein the RRQ message includes at least one of a Network Access Identifier (NAI) of the AT, the CoA for the AT, a Home of Address (HoA) that a HA allocated, a HA address, and an authentication information.

16. The method of claim 13, wherein the RRP message includes at least one of a Network Access Identifier (NAI) of the AT, the CoA for the AT to use in a new network, a Home of Address (HoA) that a HA allocated, a HA address, and an authentication information.

17. An Access Terminal (AT) for managing mobility of the AT in a mobile communication system using a Mobile Internet Protocol, the AT comprising:
  a controller for performing an authentication process of the AT with an Access Gateway (AGW), and upon receipt of a Registration Response (RRP) message, for generating a Mobile Node (MN)-Home Agent (HA) key and an MN-HA-Security Parameter Index (SPI);
  a transmitter for sending an Agent Solicitation message to the AGW, and sending a Registration Request (RRQ) message to the AGW; and
  a receiver for receiving an Agent Advertise message including a Care of Address (CoA) from the AGW in response to the Agent Solicitation message, and receiving the RRP message from the AGW.

18. The AT of claim 17, wherein a new network that the AT has entered shares a Home Agent (HA) with a home network to which the AT was connected.

19. The AT of claim 17, wherein the RRQ message includes at least one of a Network Access Identifier (NAI) of the AT, the CoA for the AT, a Home of Address (HoA) that a HA allocated, a HA address, and an authentication information.

20. The AT of claim 17, wherein the RRP message includes at least one of a Network Access Identifier (NAI) of the AT, the CoA for the AT to use in a new network, a Home of Address (HoA) that a HA allocated, a HA address, and an authentication information.

21. A method for managing mobility of an Access Terminal (AT) in an Access Gateway (AGW) for a mobile communication system using a Mobile Internet Protocol, the method comprising:
  receiving an Agent Solicitation message from the AT;
  sending an Agent Advertise message including a Care of Address (CoA) to the AT in response to the Agent Solicitation message;
  receiving a Registration Request (RRQ) message from the AT;
  sending the RRQ message to a Home Agent (HA);
  receiving a Registration Response (RRP) message from the HA; and
  sending the RRP message to the AT,
  wherein the AT generates a Mobile Node (MN)-HA key and an MN-HA-Security Parameter Index (SPI) upon receipt of the RRP message.

22. The method of claim 21, wherein a new network that the AT has entered shares the HA with a home network to which the AT was connected.

23. The method of claim 21, further comprising:
receiving an HA Internet Protocol (IP) address used for identifying the HA from an Authentication, Authorization and Accounting (AAA) server.

24. The method of claim 23, wherein the RRQ message includes at least one of a Network Access Identifier (NAI) of the AT, the CoA for the AT, a Home of Address (HoA) that the HA allocated, a HA address, and an authentication information.

25. The method of claim 23, wherein the RRP message includes at least one of a Network Access Identifier (NAI) of the AT, the CoA for the AT to use in a new network, a Home of Address (HoA) that the HA allocated, a HA address, and an authentication information.

26. An Access Gateway (AGW) for managing mobility of an Access Terminal (AT) in a mobile communication system using a Mobile Internet Protocol, the method comprising:
a receiver for receiving an Agent Solicitation message from the AT, receiving a Registration Request (RRQ) message from the AT, and receiving a Registration Response (RRP) message from a Home Agent (HA); and
a transmitter for sending an Agent Advertise message including a Care of Address (CoA) to the AT in response to the Agent Solicitation message, sending the RRQ message to the HA, and sending the RRP message to the AT,
wherein the AT generates a Mobile Node (MN)-HA key and an MN-HA-Security Parameter Index (SPI) upon receipt of the RRP message.

27. The AGW of claim 26, wherein a new network that the AT has entered shares the HA with a home network to which the AT was connected.

28. The AGW of claim 26, wherein the receiver receives an HA Internet Protocol (IP) address used for identifying the HA from an Authentication, Authorization and Accounting (AAA) server.

29. The AGW of claim 28, wherein the RRQ message includes at least one of a Network Access Identifier (NAI) of the AT, the CoA for the AT, a Home of Address (HoA) that the HA allocated, a HA address, and an authentication information.

30. The AGW of claim 28, wherein the RRP message includes at least one of a Network Access Identifier (NAI) of the AT, the CoA for the AT to use in a new network, a Home of Address (HoA) that the HA allocated, a HA address, and an authentication information.

* * * * *